June 26, 1962 W. W. GRAY 3,040,569
RATE OF CLIMB INDICATOR
Filed Dec. 24, 1958
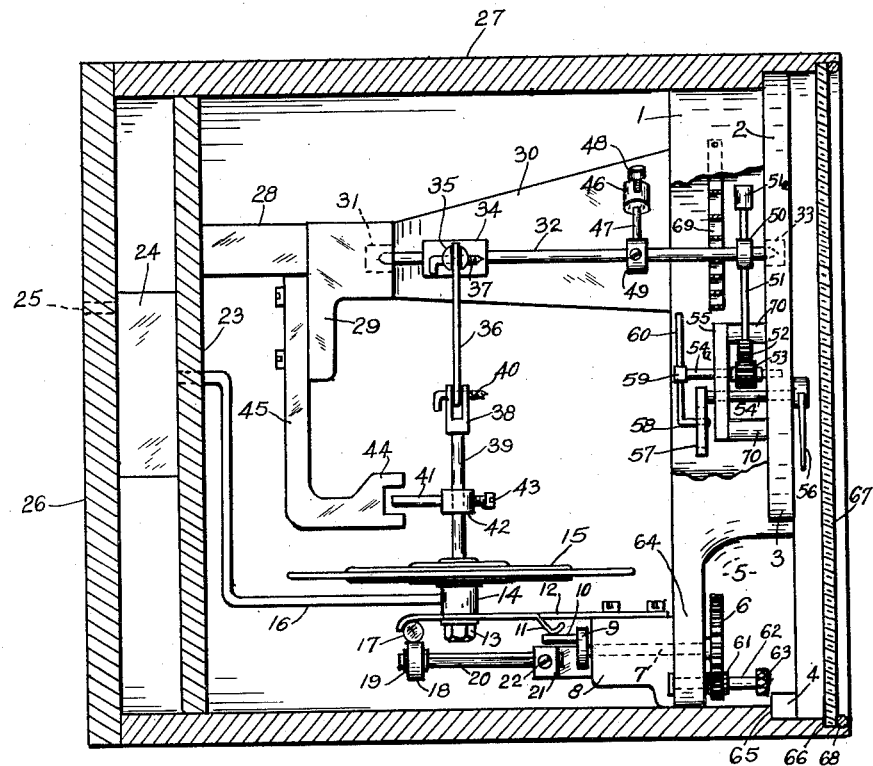
Walter W. Gray
INVENTOR.

United States Patent Office 3,040,569
Patented June 26, 1962

3,040,569
RATE OF CLIMB INDICATOR
Walter W. Gray, Charlottesville, Va., assignor to Specialties, Incorporated, Syosset, N.Y., a corporation of New York
Filed Dec. 24, 1958, Ser. No. 782,877
4 Claims. (Cl. 73—179)

This invention relates to aircraft instruments and especially to an instrument for indicating quickly the rate of climb or rate of descent of an aircraft. This application discloses improvements on the device claimed in co-pending application, Serial No. 484,678 filed January 28, 1955, now abandoned, by Robert L. Roderick.

In flying aircraft it is often important to know whether the aircraft is climbing or descending, and at what rate a change of altitude is being made.

An object, therefore, is to provide a reliable instrument for indicating the rate and direction of change of altitude.

Another object is to provide a rate of climb indicator which is compensated for temperature changes.

A further object is to provide a rate of climb indicator which will always show a zero indication when there is no change of altitude.

An additional object is to provide temperature compensation means having little friction, for a rate of climb indicator.

The drawing is a part sectional side elevation of a rate of climb indicator, similar to that disclosed in the above mentioned patent application, and including my improved temperature compensation means.

Ring shaped member 1 is integral with or attached to front plate 2 which is a partial disc having terminal portions 3 and 4. The ring member 1 has a recessed area 5, providing space for gear 6 which is attached to shaft 7 having rotary bearing in block 8 extending from ring member 1. The other end of shaft 7 has attached disc 9 from which eccentric pin 10 extends. This pin is in contact with depressed strip 11 which is integral with metal strip 12 attached to the upper face of block 8 by means of screws, as shown. Threaded nut 13 is screwed onto a threaded rod passing through a hole in strip 12 and being attached to the bottom surface of cylinder 14 the upper end of which is attached to wafer type pressure-sensitive element 15 the interior of which communicates with cylinder 14 so that air supplied to cylinder 14 through attached tube 16 will expand the element 15 in varying degree, depending upon the air pressure.

Small steel rod 17, seen end-on, is welded or otherwise attached to the left end of strip 12 which may be curved as shown. This cylinder may be straight or slightly curved, as desired, and it can be made of glass or other hard material and suitably attached to element 12 by an adhesive or by clamps or the like. Roller or outer race member 18 of a small ball bearing is arranged to be in contact with rod 17. The inner race or ring 19 of the bearing is frictionally or otherwise attached to bimetal rod 20 the right end of which is fastened in a hole in bracket 21 extending from block 8, by means of screw 22. My invention is particularly concerned with the rod and roller construction described, for reasons which will be described in connection with the operation of the device.

Tube 16 is somewhat flexible and allows a degree of vertical movement of cylinder or cup 14 and attached member 15. This tube passes through circular wall 23 and into housing 24 which contains a porous ceramic or other element for restricting air flow. The inlet end of the flow restricting device is connected with tube 25 passing to atmosphere through a hole in cover end plate 26 which may be attached to cylindrical casing 27 by means of screws. Housing 24 may also contain cylinders and spring supported pistons for providing quick flow of air to or from the air system during quick changes of elevation. Such devices are described in the referenced patent application and, accordingly, will be illustrated by a block diagram. Likewise, the air connections may be made by suitably aligned ports or ducts in members 23, 24, and 26 so that the device may be assembled or disassembled easily. Wall or partition 23 may be attached to block 28 extending from bracket 29 or it may be integral with or attached to casing 27. The casing and members 23 and 26 may be made of metal but are preferably made of suitable plastic material, like Bakelite, for instance.

Bracket 29 extends inward from arm 30 which is integral with member 1. Bearing 31, preferably of jewel type, is fastened in a recess in bracket 29 and supports a tapered end of light shaft 32 the other tapered end of which is supported in similar bearing 33 fitted into a recess in front plate 2. Wide collar 34 is fastened around shaft 32 and slotted rod 35 extends from this collar. Link 36 is pivotally attached to slotted rod 35 by means of partially threaded pin 37 and the other end of this link is pivotally attached to yoke 38 of rod 39 by a similar pin 40. Arm 41 extends from collar 42 which is adjustably attached to rod 39 by means of screw 43. The arms of yoke 44 serve as stops for generally vertical movement of arm 41, thereby preventing excessive distortion or expansion of air pressure sensitive member 15. Yoke 44 is integral with arm 45 which is attached to bracket 29 by means of screws.

Counter-weight 46 may be adjusted in position on arm 47 by means of screw 48. Arm 47 is fastened to collar 49 which may be adjusted in position on shaft 32 by means of a screw. This counter-weight is for the purpose of balancing the weight of arm 35 and associated mechanism.

Collar 50, having attached counter-weight 51a, is fastened to shaft 32 and has attached arm 51 carrying gear segment 52 coaxial with shaft 32. This gear segment is meshed with pinion 53 attached to shaft 54a having limited rotary bearing in bar 55 and plate 2. This bar is fastened to plate 2 by suitable screws and is supported by spacers or collars 70. Shaft 54 likewise has rotary-bearing in members 55 and 2 but this shaft passes through plate 2 and supports attached needle or indicator 56 which is rotatable through a considerable angle over a dial attached to the front surface of plate 2 or etched or painted on this surface. In actual practice it is preferable to cut away portions of plate 2 to reduce weight, in which case a separate dial will be attached to this plate.

Arm 57 having an elongated slot is attached to shaft 54 and right angled arm 58, which is attached to collar 59, works in the slot in arm 57. Collar 59 is attached to shaft 54a and carries arm 60 as a counter-weight.

Pinion 61 is fastened on shaft 62 having knurled button 63 which may be placed outside of the casing if desired. This shaft is rotatable in a bearing in portion 64 of member 1 and the button may be turned to rotate gear 6. Plate 2 may be fastened in position by suitable screws threaded into the casing which may be provided with shoulders 65 and 66. Glass or clear plastic cover plate is fitted against shoulder 66 and may be held in place by retainer ring 68, although any other suitable construction may be used. Spiral spring 69 is fastened to shaft 32 and to member 1 and serves to bias the shaft yieldingly in order to minimize backlash in the system including gears 52 and 53 and the various links and pivots in the system. This spring may also be used to assist in calibrating the system, if desired.

In operation, when an aircraft carrying the device rises in altitude rather quickly the air surrounding member 15 is quickly reduced in density whereas the air density within member 15 is slowly reduced due to flow of air outward through tube 16 and flow restricting means 24. The resiliency of member 15 will therefore cause it to expand in proportion to the pressure difference and so rod 39 and the linked end of arm 35 will be lifted, thereby rotating shaft 32, pinion 53, gear segment 52, arm 58, slotted arm 57, and attached pointer 56 which will rotate through an angle proportional to the rate of climb. The arm 58 works in slotted arm 57 in such a manner that the angular rotation of pointer 56 is greater for relatively low rates of climb than for equivalent changes at higher rates of climb.

For relatively quick descents the air conditions are opposite to those described. The pressure and density of the surrounding air becomes suddenly greater than that within member 15 and before the air flowing inward through restricting means 24 has had time to equalize the pressure the member 15 is slightly compressed, thereby pulling rod 39 downward and causing pointer 56 to rotate through an angle in opposite direction to that previously described. Of course, after the aircraft ceases to change altitude the air pressures inside and outside member 15 soon become equalized and pointer 56 then should indicate zero rate of climb or rate of descent.

In order to compensate the device for temperature changes bimetal rod 20 will bend in one direction for a rise of temperature and in opposite direction for a fall of temperature below the normal or calibrated value. When rod 20 bends to lift roller 18 the rod 17 and attached end of resilient strip 12 are lifted, resulting in slightly lifting member 15 and attached rod 39 to rotate pointer 56 sufficiently to keep it on the zero mark. A change of temperature in opposite direction will cause bimetal element 20 to lower roller 18 and the resiliency of element 12 will cause rod 17 to follow the supporting roller, producing an opposite rotation of pointer 56 through an angle which will maintain the pointer on the zero mark, assuming constant pressure conditions. The magnitude of the temperature compensation may be regulated by loosening screw 22 and rotating rod 20 through an angle just sufficient to provide the desired vertical component displacement of the rod and attached roller 18. The direction of bend of rod 20 may be varied from a truly horizontal bend to an entirely vertical displacement, depending upon the angular rotation of rod 20 in its bearing. The rod is fastened by tightening screw 22 when the proper compensating angle has been determined.

It will be seen that there will be a horizontal component displacement of rod 20 and roller 18 for any angular position of the rod other than that providing true vertical movement of the rod end. In prior devices, which have not employed rollers, this horizontal component movement, as well as somewhat vertical displacement, has caused considerable friction between the compensating bimetal rod 20 and the resilient element 12 so that it was very difficult to get the needle or pointer to return to zero under conditions of no pressure change. This friction has caused displacement of member 12 and the associated member 15 and pointer 56 so that the latter often indicated a spurious rate of climb of as much as one hundred feet per minute, or more, particularly where a change of temperature was involved. This behavior has been most annoying and at times even dangerous in furnishing pilots false indications. By providing virtually frictionless contact of roller 18 with a relatively narrow line path on the under surface of cylinder or rod 17 I have eliminated the aforesaid difficulties and defects in prior instruments and repeated tests have shown that the pointer in my rate of climb indicator will reliably return to the zero mark after an indication and over a considerable range of temperatures. My device will therefore provide pilots with a much more reliable instrument for indicating rate of climb or rate of descent.

The device may be compensated for large temperature variations or for great changes of pressure or other factors, by rotating disc 9 to lift or lower pin or arm 10 and contiguous element 11 which lifts or lowers element 15 and rod 39. As stated, button 63 may be placed outside the casing. This casing has a hole or sufficient leakage to admit the surrounding atmosphere freely to the space surrounding pressure sensitive member 15.

The particular novelty of my construction is pointed out in the following claims.

What I claim is:

1. In a device for indicating rate of change of altitude of an aircraft, air pressure sensitive means, means for admitting air freely to the exterior of said pressure sensitive means, means for restricting flow of air to the interior of said pressure sensitive means, resilient means supporting said pressure sensitive means for limited movement, a bimetal rod, means mounting an end portion of said rod for adjustable angular movement, about its longitudinal axis, means for fastening said rod in adjusted position, a ball bearing having its inner race member attached to the free end portion of said rod, a relatively hard rod attached to said resilient means, the outer race member of said bearing being in contact with said hard rod and rollable therealong, means for adjusting the position of said resilient means, and means connected with said pressure sensitive means for indicating rate of change of altitude.

2. In a rate of climb indicating device, in combination, air pressure sensitive means, a flexible metal strip fixed to said device at an end portion of said strip, means attaching said pressure sensitive means to said strip adjacent the other end thereof, a bimetal element carrying a roller adjacent an end thereof, means adjustably mounting the other end portion of said bimetal element so that it can be rotated through predetermined angles about its longitudinal axis and fastened to cause bending thereof in predetermined planes due to change of temperature thereof, a member having a smooth surface and attached to said metal strip, said member being yieldingly in contact with said roller, and means connected with said pressure sensitive means for indicating rate of climb.

3. The device as described in claim 2, said member comprising glass-like material.

4. The device as described in claim 2, said member comprising a rod of glass having its axis substantially at right angles to the axis of said roller.

References Cited in the file of this patent

UNITED STATES PATENTS

| | | |
|---|---|---|
| 2,251,955 | Rafferty | Aug. 12, 1941 |
| 2,268,847 | Rafferty | Jan. 6, 1942 |
| 2,742,547 | Tsai | Apr. 17, 1956 |